2,844,621

ALKYLAMINOALKYL 4-ALKOXY-2,6-DIALKYLBENZOATES

Jack Bernstein and Barbara Stearns, New Brunswick, N. J., assignors to Olin Mathieson Chemical Corporation, New York, N. Y., a corporation of Virginia No Drawing. Application November 1, 1955
Serial No. 544,363

3 Claims. (Cl. 260—473)

This invention relates to new 2,6-di(lower alkyl)-4-(lower alkoxy)-benzoic acid esters of (lower alkyl) amino-substituted lower alkanols which are advantageous topical anesthetics, having, for example, enhanced stability.

The new compounds of this invention may be represented by the following formula:

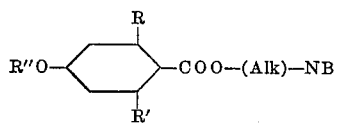

wherein R and R' are lower alkyl (preferably lower alkyl of 1 to 4 carbon atoms, and especially methyl), R'' is methyl or ethyl, Alk is a lower alkylene, which may be straight or branched (preferably a lower alkylene of 2 to 5 carbon atoms and especially ethylene), and NB is (lower alkyl)-amino (e. g. methylamino, ethylamino and propylamino) or di-(lower alkyl)-amino (e. g. dimethylamino, diethylamino, dipropylamino and methylpropylamino). The new compounds may be obtained either as free bases or as acid-addition salts, and either of these forms may be converted to the other in the conventional manner.

The new compounds are readily prepared by reacting the desired 2,6-di(lower alkyl)-4-(lower alkoxy)-benzoic acid, in its alkali-metal salt form, with a (lower alkyl) amino-(lower alkyl) halide (particularly chloride); or by reacting the desired 2,6-di(lower alkyl)-4-(lower alkoxy)-benzoyl halide (particularly chloride) with a (lower alkyl) amino-lower alkanol. In either case, the reaction is advantageously carried out in an inert organic solvent at an elevated temperature (e. g. reflux).

The esters of this invention are generally recovered in the form of their addition salts with hydrochloric acid (i. e. as the hydrochloride). However, salts may be prepared with other acids forming addition salts with amines, for example, by converting the hydrochloride to the free base by treatment with a basic reagent such as potassium carbonate, and subsequent reaction of the free base with the desired acid (e. g. with boric, nitric, lactic, tartaric, citric, phosphoric, sulfuric, or picric acid, a non-toxic acid being employed where the salt is to be the final compound).

The following examples are illustrative of the invention:

EXAMPLE 1

β-Diethylaminoethyl ester of 4-ethoxy-2,6-xylinic acid

A solution of 4.25 g. (0.185 mole) sodium in 200 ml. isopropanol is treated with 34 g. (0.185 mole) 4-ethoxy-2,6-xylinic acid and the mixture is refluxed one hour. The cooled mixture is then treated with 25 g. (0.185 mole) diethylaminoethyl chloride. It is stirred one hour at room temperature and three hours at reflux temperature. The alcohol is distilled off and the residue is treated with 100 ml. water and alkalinized with potassium carbonate. The base is extracted into ether. The extracts are dried and concentrated. Distillation of the base gives about 40.5 g. yellow oil, B. P. about 177° (3 mm.). This base dissolved in 100 ml ethanol is treated with an equivalent quantity of alcoholic hydrogen chloride. Precipitation with ether gives about 42.5 g. solid, M. P. about 140–141° C. Three recrystallizations from isopropanol gives about 29 g. white solid, M. P. about 149–150° C.

EXAMPLE 2

β-Ethylaminoethyl ester of 4-ethoxy-2,6-xylinic acid

To 20 grams 4-ethoxy-2,6-xylinic acid is added 60 grams thionyl chloride. The mixture is heated on the steam bath for six hours. The excess thionyl chloride is removed in vacuo and the residue fractionally distilled to give 13.6 grams 4-ethoxy-2,6-dimethylbenzoyl chloride. 12.5 grams of this fraction and 7.4 grams ethylaminoethanol hydrochloride are mixed with 50 ml. acetonitrile and refluxed for three hours. The solution is diluted with 200 ml. ether and the solid filtered off. This product is dissolved in 200 ml. water, washed with 100 ml. ether and the aqueous extract made alkaline with excess potassium carbonate. The oil is extracted with 2 x 100 ml. ether and dried over magnesium sulfate. The ether is removed and the residue distilled to give about 7.8 g. of the base boiling at about 179–180° at 4 mm. 7.1 g. of this base is dissolved in 200 ml. acetone and the solution made acid with dry alcoholic hydrogen chloride. The precipitated material is filtered and recrystallized from 125 ml. of ethanol-ether to yield about 8 grams of the hydrochloride salt, a white crystalline solid melting at about 215–216° C.

EXAMPLE 3

β-Diethylaminoethyl ester of 4-methoxy-2,6-xylinic acid

To a solution of 2.4 g. sodium in 200 ml. isopropanol is added 19 grams 4-methoxy-2,6-xylinic acid (J. Am. Chem. Soc. 63, 2647 (1941)). The mixture is stirred for 1 hour at room temperature when 14.2 g. diethylaminoethyl chloride is added slowly. After the addition the mixture is refluxed four hours. The isopropyl alcohol is distilled off at reduced pressure and the residue dissolved in water, and made alkaline with potassium carbonate. The base is extracted with 2 x 150 ml. ether, extracts dried over magnesium sulfate. The filtered solution is acidified with alcoholic hydrogen chloride and the solid filtered and recrystallized from 135 ml. isopropyl alcohol to give about 18.5 grams of a white crystalline powder melting at about 175–176° C.

The invention may be otherwise variously embodied within the scope of the appended claims.

We claim:

1. A compound selected from the group consisting of free bases of the general formula

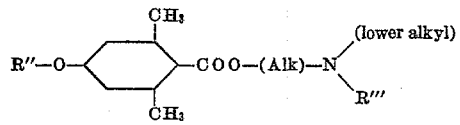

wherein R″ is a member of the group consisting of methyl and ethyl, Alk is a lower alkylene, and R‴ is a member of the group consisting of hydrogen and lower alkyl; and the acid-addition salts thereof.

2. The compound of claim 1 wherein R″ is ethyl.
3. The compound of claim 1 wherein R″ is methyl.

References Cited in the file of this patent
UNITED STATES PATENTS

| | | |
|---|---|---|
| 2,243,694 | Christiansen et al. | May 27, 1941 |
| 2,431,553 | Hamilton | Nov. 25, 1947 |

FOREIGN PATENTS

| | | |
|---|---|---|
| 512,826 | Belgium | July 31, 1952 |

OTHER REFERENCES

Dvoretsky et al.: J. Org. Chem., 18, 615 to 619 (1953).
Rabjohn et al.: J. Org. Chem. 20, 271 to 273 (1955) (received Nov. 4, 1954).